United States Patent
Yamamoto

(10) Patent No.: US 6,607,098 B2
(45) Date of Patent: Aug. 19, 2003

(54) ALLOCATING MECHANISM FOR A WEIGHING APPARATUS

(75) Inventor: Shingo Yamamoto, Kurita-gun (JP)

(73) Assignee: Ishida Co., Ltd., Kyoto (JP)

( * ) Notice: Subject to any disclaimer, the term of this patent is extended or adjusted under 35 U.S.C. 154(b) by 225 days.

(21) Appl. No.: 09/904,832

(22) Filed: Jul. 16, 2001

(65) Prior Publication Data

US 2002/0011433 A1 Jan. 31, 2002

(30) Foreign Application Priority Data

Jul. 19, 2000 (JP) ........................... 2000-218164

(51) Int. Cl.[7] ................................. B67D 5/08
(52) U.S. Cl. ..................... 222/52; 222/63; 222/77; 222/166; 222/199
(58) Field of Search ................... 222/56, 63, 77, 222/166, 185.1, 199, 536; 177/25

(56) References Cited

U.S. PATENT DOCUMENTS

| | | | |
|---|---|---|---|
| 4,569,406 A | * | 2/1986 | Pringle et al. ............... 177/25 |
| 4,615,403 A | * | 10/1986 | Nakamura .................. 177/25 |
| 4,753,306 A | | 6/1988 | Mosher |
| 4,901,807 A | | 2/1990 | Muskat et al. |
| 5,074,436 A | * | 12/1991 | Inoue ....................... 222/56 |
| 5,323,939 A | | 6/1994 | Young |

FOREIGN PATENT DOCUMENTS

| | | |
|---|---|---|
| DE | 841064 | 6/1952 |
| DE | 3537426 A1 | 4/1987 |
| DE | 4404897 A1 | 8/1995 |

* cited by examiner

*Primary Examiner*—Philippe Derakshani
(74) *Attorney, Agent, or Firm*—Shinjyu Global IP Counselors, LLP

(57) ABSTRACT

An allocating mechanism of a weighing apparatus that temporarily stores objects and allocates the objects to a plurality of hoppers disposed below is provided to reduce the amount of objects that remain without being allocated. The allocating mechanism 21 is included in the weighing apparatus. The allocating mechanism 21 is a mechanism that temporarily stores objects, and allocates the objects to hoppers 24 and 25 disposed below. The allocating mechanism 21 includes a tubular member 61, a bottom plate 62, a driving motor, and a controller. The bottom plate 62 can, together with the tubular member 61, form a storage space S, in which the objects are stored. The driving motor rotates the tubular member 61 and the bottom plate 62. The controller controls the driving motor to rotate the tubular member 61 and the bottom plate 62, such that the objects are dropped in one of the hoppers 24 and 25.

9 Claims, 12 Drawing Sheets

ALLOCATING MECHANISM FOR A WEIGHING APPARATUS

BACKGROUND OF THE INVENTION

1. Field of the Invention

The present invention relates to an allocating mechanism for a weighing apparatus. More specifically, the present invention relates to an allocating mechanism that allocates objects to a plurality of paths before or after weighing the objects.

2. Background Information

Generally, in order to perform weighing at a high speed and with high precision, it is desirable to perform combination weighing. In combination weighing, the weight or the number of objects that are contained in each of a plurality of hoppers is calculated with a load cell (weight detector). A combination process is performed for each of the calculated values, such that a plurality of hoppers that generates a weight within a predetermined range is selected. The objects are then collected from these hoppers. In this manner, a collection of objects having a predetermined weight or number can be obtained.

A weighing apparatus that performs the above described combination weighing is disclosed in Japanese Laid-Open Patent Publication H7-306086. In this apparatus, the objects to be weighed (hereinafter referred to as objects) are dropped from a pool hopper into one of a pair of weighing hoppers. The pool hopper has two open/close gates, and is able to allocate the objects in the pair of weighing hoppers.

Although the objects are allocated before being weighed in the aforementioned publication, the objects can also be allocated at the time the objects are discharged after weighing the objects.

The operation of the allocating mechanism utilized in a conventional weighing apparatus is shown in FIG. 12. The allocating mechanism mainly includes a tubular sidewall 1, and two bottoms 2 and 3. As shown in FIG. 12(*b*) and FIG. 12(*e*), the bottoms 2 and 3 are opened and closed by an open/close means, which is not shown in the Figures. When the bottoms 2 and 3 are both closed, the sidewall 1 and the bottoms 2 and 3 form a storage space, in which the objects are stored. The allocating mechanism is disposed above the hoppers 4 and 5, which are two paths into which the objects are allocated. Here, the bottom 2 is opened when the objects in the storage space are to be dropped to the hopper 4. Similarly, the bottom 3 is opened when the objects are to be dropped from the bottom 3.

The allocating mechanism having a structure shown in FIG. 12 generally has little problem as long as the allocating mechanism handles certain objects. However, depending on the objects, the allocating mechanism may not be able to discharge the objects in the storage space fully to the hoppers 4 and 5. Accordingly, the calculation process, which is a process to be performed after the allocation, may be negatively affected. Additionally, since the objects that have been weighed in the previous process are not discharged fully in the subsequent process a situation in which the weight of the objects do not amount to the desired weight can occur.

For instance, in the case of objects such as sticky fermented soybeans, the objects may not fully be dropped to the hoppers 4 and 5 even after opening the bottoms 2 and 3. In other words, even when an operation to drop the objects P1 to the hopper 4 is performed as shown in FIG. 12(*b*), a portion of the objects P1*a* may adhere to the bottom 3 (see FIG. 12(*c*)). Alternatively, a portion of the objects P2*a* may remain on the bottom 2 (see FIG. 12(*f*)) even when an operation to drop the objects P2 to the hopper 5 is performed. When this happens the amount of the portions of the object P1*a* and P2*a* cannot be taken into consideration, and the precision in the amount of the object to be dropped in the hoppers 4 and 5 decreases.

In view of the above, there exists a need for an allocating mechanism for a weighing apparatus that overcomes the above mentioned problems in the prior art. This invention addresses this need in the prior art as well as other needs, which will become apparent to those skilled in the art from this disclosure.

SUMMARY OF THE INVENTION

An object of the present invention is to provide an allocating mechanism for a weighing apparatus that temporarily stores objects and allocates the objects to a plurality of paths disposed below while reducing the amount of objects that remain in the weighing apparatus without being allocated to the paths.

An aspect of the present invention provides an allocating mechanism in a weighing apparatus. The allocating mechanism temporarily stores objects and allocates the objects to a plurality of paths disposed below after or before the objects are weighed. The allocating mechanism includes a sidewall, a bottom, driving means, and a controller. The bottom can, together with the sidewall, form a storage space in which the objects are stored. The driving means moves at least the sidewall. The controller rotates the sidewall by controlling the driving means such that a bottom end of the sidewall swings, thereby dropping the objects to one of the paths.

In this allocating mechanism, the objects that are conveyed are temporarily stored in the storage space that is formed by the sidewall and the bottom. Then, at least the sidewall is rotationally moved when the objects are dropped to one of the paths.

Conventionally, the allocating mechanism has a plurality of bottoms, such that the objects are allocated based on which bottom is open. Therefore, if the objects are stuck to the bottom that is closed, the objects cannot be dropped. However, the mechanism as set forth in the present invention has a sidewall that swings. Therefore, the sidewall can be moved so that the bottom is not below the sidewall. Accordingly, almost none of the objects remain on the bottom. Even if the objects are sticky, almost all the objects are dropped in one of the paths. Additionally, the path to which the objects are to be dropped can be controlled by changing the rotational direction of the sidewall.

The sidewall is moved rotationally such that a bottom end of the sidewall swings. Therefore, when an upper portion of the sidewall is an input portion, the input portion hardly moves. Accordingly, it is possible to prevent the objects from spilling during the allocation. That is, the cleanability of the weighing apparatus that has this allocating mechanism increases.

A second aspect of the present invention provides the allocating mechanism of the first mentioned aspect, wherein the sidewall is formed with a substantially vertical surface. Additionally, the bottom is formed with a substantially horizontal curved surface that does not hinder the rotation of the sidewall. Since the sidewall is formed of a substantially vertical surface, the objects can be prevented from being stuck to the sidewall. Additionally, since the bottom is substantially horizontal and the sidewall is substantially vertical, as the sidewall moves relative to the bottom, the sidewall functions as a scraper. Accordingly, objects that are stuck to the substantially horizontal bottom can be scraped off.

A third aspect of the present invention provides the allocating mechanism of either of the previously mentioned aspects, wherein the driving means moves both of the sidewall and the bottom, such that the sidewall and the bottom move away from each other. The bottom, as well as the sidewall, is moved along with the sidewall. Therefore, the amount of movement required in order to remove the bottom from below the sidewall becomes smaller. In particular, when the sidewall is moved rotationally, the inclination of the sidewall at the time of dropping the objects can be kept almost vertical. By utilizing a link mechanism, it is also possible to move both the sidewall and the bottom using one driving source, such that the sidewall and the bottom move away from each other.

A fourth aspect of the present invention provides the allocating mechanism set forth in the third mentioned aspect, wherein the storage space formed by the sidewall and the bottom is disposed above two of the paths so as to straddle the two paths. The storage space formed by the sidewall and the bottom is disposed so as to straddle the two paths to which the objects are allocated. Therefore, the amount of movement of the sidewall and the bottom can be kept small, regardless of the path to which the objects are allocated.

A fifth aspect of the present invention provides the allocating mechanism of any of the previously mentioned aspects, wherein the controller controls the driving means to vibrate the sidewall above the paths at the time of dropping the objects in one of the paths. The sidewall vibrates when the objects are dropped to the paths. Therefore, even if the objects are adhesive, are stuck to the sidewall, and do not come off easily, the vibration of the sidewall shakes off most of the objects. The vibration of the sidewall can be caused by small reciprocating movements of the sidewall, and also by banging on the sidewall.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
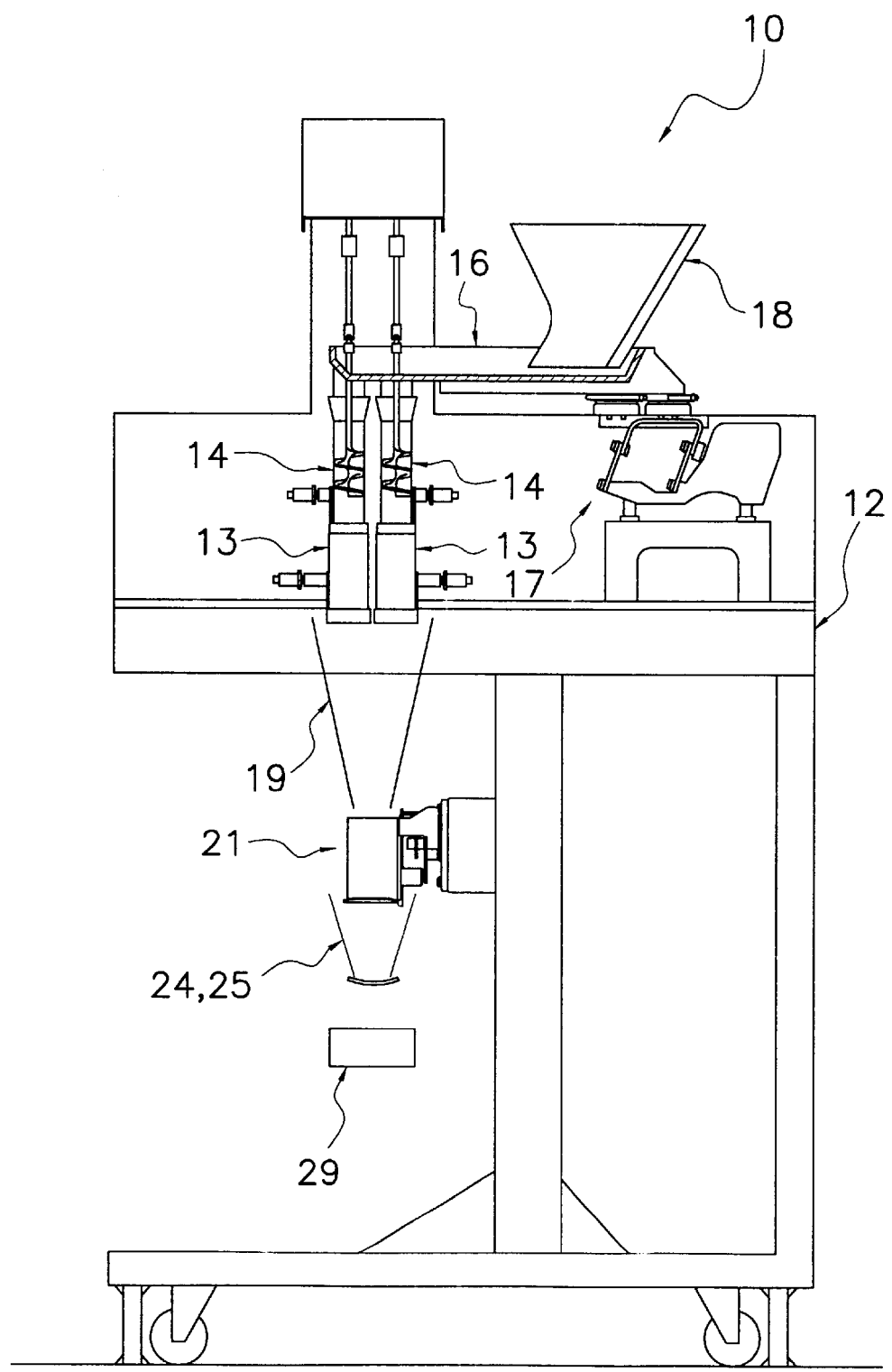
FIG. 1 is a vertical cross-sectional elevational view of a combination weighing apparatus in accordance with an embodiment of the present invention.
Figure 2:
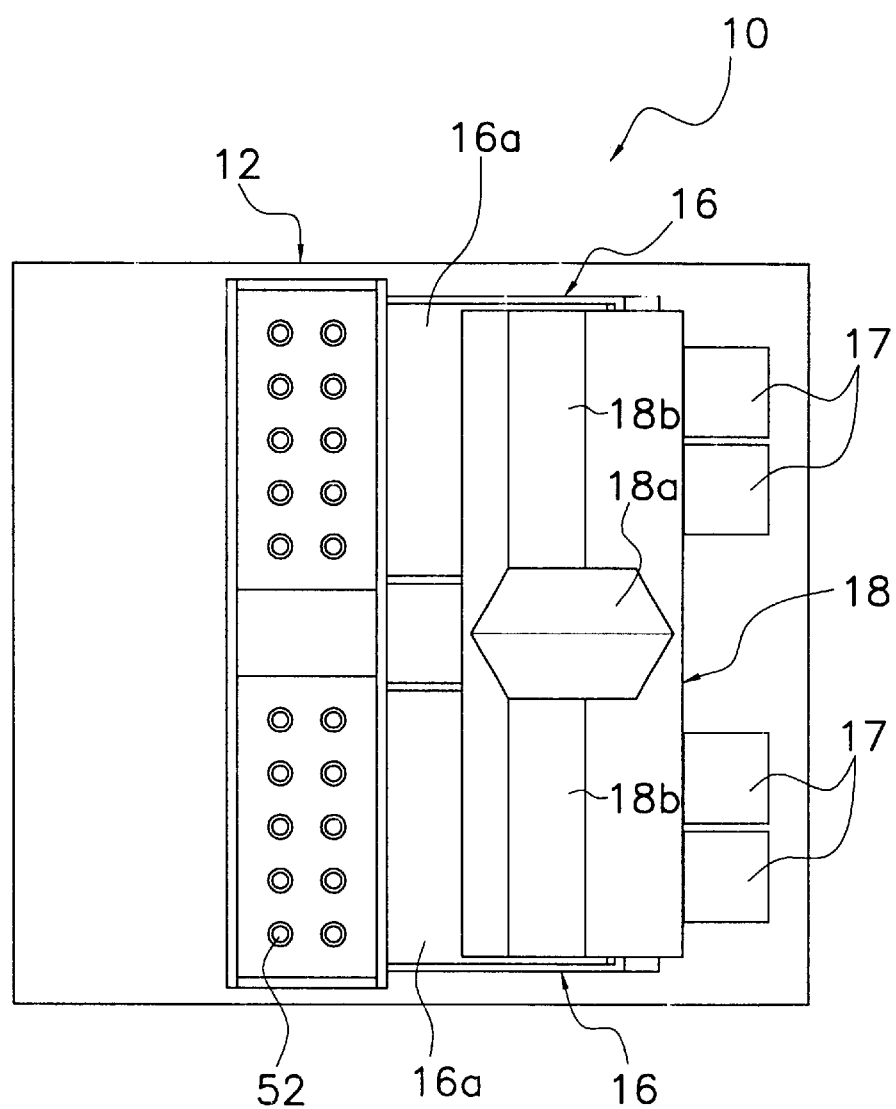
FIG. 2 is a plan view of the combination weighing apparatus of FIG. 1 viewed from above.
Figure 3:
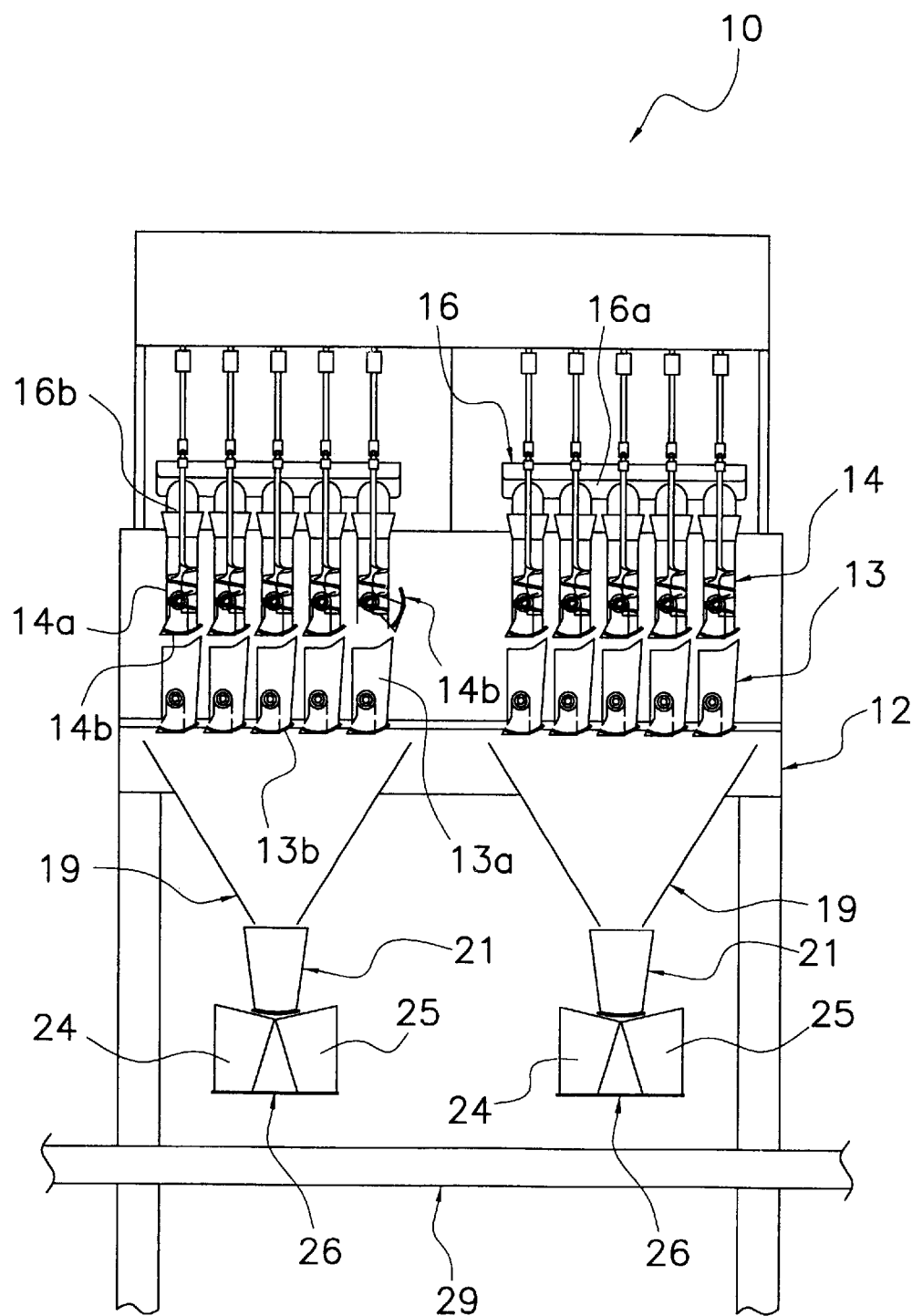
FIG. 3 is a partial cross-sectional elevational view of the combination weighing apparatus of FIG. 1.

A combination weighing apparatus 10 having an allocating mechanism 21 in accordance with a first embodiment of the present invention is shown in FIGS. 1–3. FIG. 1 is a vertical cross-sectional elevational view of the apparatus. FIG. 2 is a plan view of the apparatus viewed from above, and FIG. 3 is a partial cross-sectional elevational view. The combination weighing apparatus 10 is an apparatus for sequentially creating a batch of objects such as fermented soybeans. The batch has a predetermined weight of the objects supplied from an input chute 18 disposed in rear. The combination weighing apparatus 10 also conveys the batch to a packaging apparatus 29, which performs subsequent processes.

Entire Structure

The combination weighing apparatus 10 includes a frame 12, twenty weighing hoppers 13, twenty compulsory vertical conveying mechanisms 14, two common troughs 16, electromagnetic feeders 17 disposed for each common trough 16, an input chute 18, a discharge collection chute 19, an allocating mechanism 21, allocation hoppers 24 and 25, a conveyor 29, and a controller 30 that controls various driving portions (such as driving motor).

The weighing hoppers 13 and compulsory vertical conveying mechanisms 14 are paired. Two groups are symmetrically disposed on left and right sides, each group having ten pairs that are aligned in two rows of five pairs. Two pairs of common troughs 16 and electromagnetic feeders 17 are disposed symmetrically on left and right sides. Each pair of common troughs 16 and electromagnetic feeders 17 corresponds to a group of ten pairs of weighing hoppers 13 and compulsory vertical conveying mechanisms 14. In other words, in the combination weighing apparatus 10, a pair of common troughs 16 and electromagnetic feeders 17 and pairs of weighing hoppers 13 and compulsory vertical conveying mechanisms 14 aligned in two rows of five pairs form one group. The same groups are disposed on left and right sides. For these two groups disposed on left and right sides, there is one input chute 18. Objects that are supplied to a center portion 18a of the input chute 18 are divided to left and right. Then, the objects are moved downward to each common trough 16 through bottom openings 18b.

Common Trough and Electromagnetic Feeder

The common trough 16 is a member for feeding objects that are moved down from the input chute 18 in a forward direction (toward left hand side in FIG. 1) toward the compulsory vertical conveying mechanism 14. The common trough 16 includes two plate portions 16a disposed on both sides and a cylindrical portion 16b.

A rear portion of the plate portion 16a is disposed below the input chute 18, so as to receive objects that are dropped from the input chute 18. A bottom surface of a front portion of the plate portion 16a has ten circular bores formed thereon. Cylindrical portions 16b extend downward from each circular bore 16a. Each common trough 16 is provided with ten bores and circular portions 16a, which are aligned in two rows of five circular bores and circular portions in plan view.

The electromagnetic feeder 17 supports a bottom surface of the common trough 16 with a support member, and vibrates the support member in a front-back direction. The objects that are moved downward onto a rear portion of the plate portion 16a from the input chute 18 are fed to the front portion of the plate portion 16a by the vibration.

Compulsory Vertical Conveying Mechanism

The compulsory vertical conveying mechanism 14 is a mechanism for temporarily storing the objects to be inputted to the weighing hoppers 13, and for conveying downward the objects stored in the front portion of the common trough 16. The compulsory vertical conveying mechanism 14 compulsorily sends the objects down to a space below by rotating screws through rotation of the driving motor 52.

The compulsory vertical conveying mechanism 14 mainly includes tubular members 14a, gate mechanisms 14b, screws, and a driving motor. The gate mechanisms 14b open and close openings at the bottom of tubular members 14a. The screws are disposed inside tubular members 14a. The driving motor 52 rotates the screws.

The tubular member 14a is a tubular member whose upper end and bottom end are open. An upper portion of the tubular member 14a has a conical shape that opens upward. In this portion, a bottom portion of the cylindrical portion 16b of the common trough 16 is disposed. The screw is inserted into a middle portion (center portion) of the tubular member 14a.

The gate mechanism 14b is a mechanism that includes a driving motor 14c (see FIG. 4) and a gate member. The gate member can close a bottom opening of the tubular member 14a, and rotates as the driving motor 14c operates. As the gate member rotates, the bottom opening of the tubular member 14a is switched between a closed state and an open state.

The driving motor 52 is disposed above the common trough 16. The driving motor 52 is fixed to the frame 12 such that its rotational axis is on the bottom. The screw is coupled to this rotational axis of the driving motor 52 via a connecting rod.

Weighing Hopper

The weighing hopper 13 includes a tubular main body 13a, a gate mechanism 13b, and a load cell 13c. The gate mechanism 13b can close a bottom opening of the main body 13a. The load cell 13c measures the weight of objects in the main body 13a (see FIG. 4). The main body 13a is disposed directly below the tubular member 14a of the compulsory vertical conveying mechanism 14. The gate mechanism 13b is a mechanism including a driving motor 13d and a gate member. The gate member can close a bottom opening of the main body 13a. The gate member rotates as the driving motor 13d operates. As the gate member rotates, the bottom opening of the main body 13a is switched between a closed state and an open state.

Two rows of weighing hoppers 13 are disposed in a front-back arrangement when viewed from above. Each row contains five weighing hoppers 13. The weighing hoppers 13 are disposed in each of the left and right groups. The compulsory vertical conveying mechanisms 14 are paired with the weighing hoppers 13 and are disposed above the weighing hoppers 13. In other words, ten weighing hoppers 13 are symmetrically disposed on each of the left and right sides.

Discharge Collection Chute

The discharge collection chute 19 is provided below a group of weighing hoppers 13, on each of the left and right sides. Each group contains ten weighing hoppers 13. These discharge collection chutes 19 are fixed to the frame 12. The discharge collection chutes 19 collect objects dropped from several weighing hoppers 13, and put the objects together in one batch.

Allocating Mechanism

Figure 5:
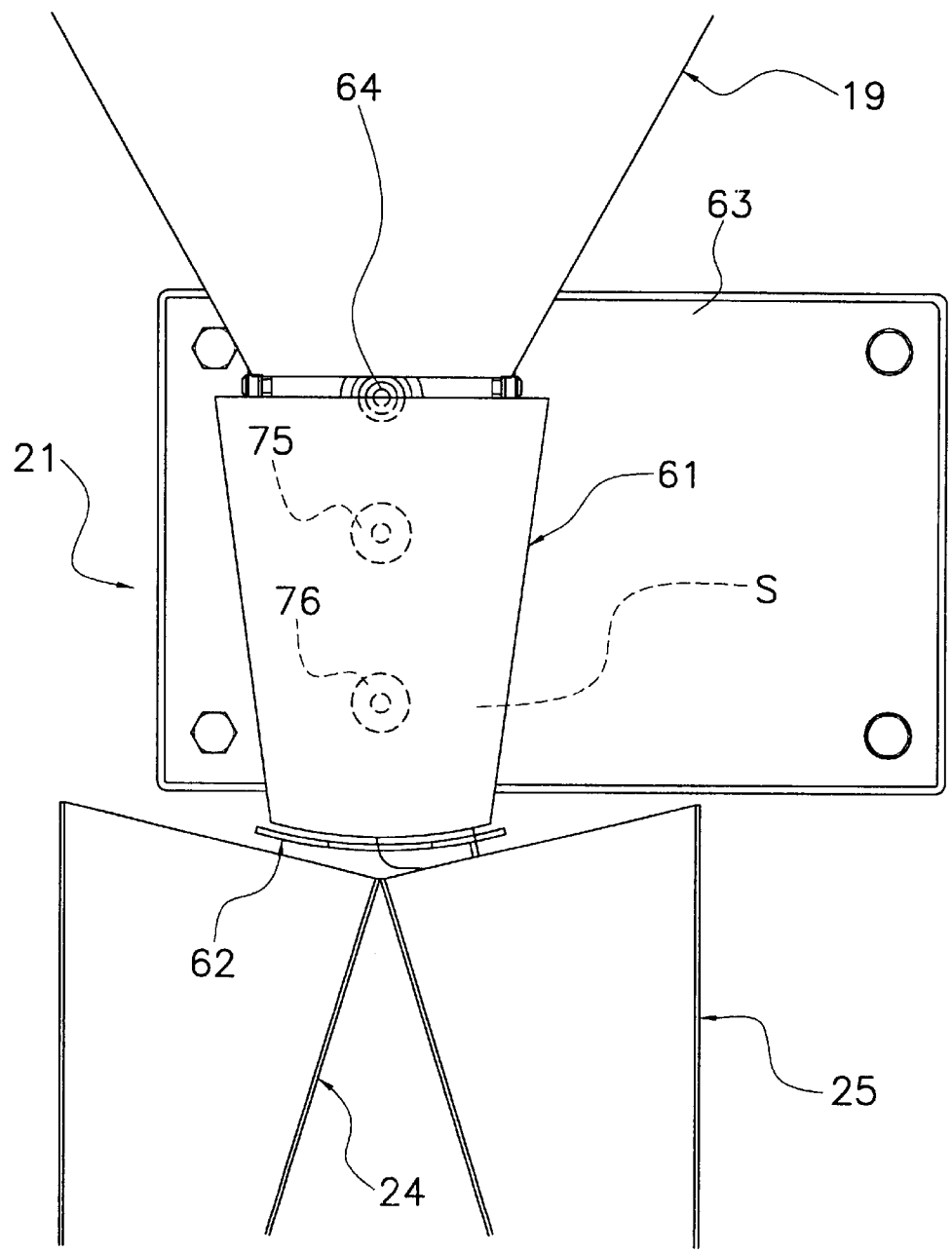
FIG. 5 is an elevational view of the allocating mechanism of FIG. 1.

The allocating mechanism 21 is a mechanism that temporarily stores objects that have been weighed and put together in one batch by the discharge collection chute 19. The allocating mechanism 21 allocates the objects to the two allocation hoppers 24 and 25 that are disposed below an exhaust port of the discharge collection chute 19. As seen in FIG. 5, the allocating mechanism 21 mainly includes a tubular member (sidewall) 61, a bottom plate (bottom) 62, a support body 63, and a driving portion.

Tubular Member

Figure 7:
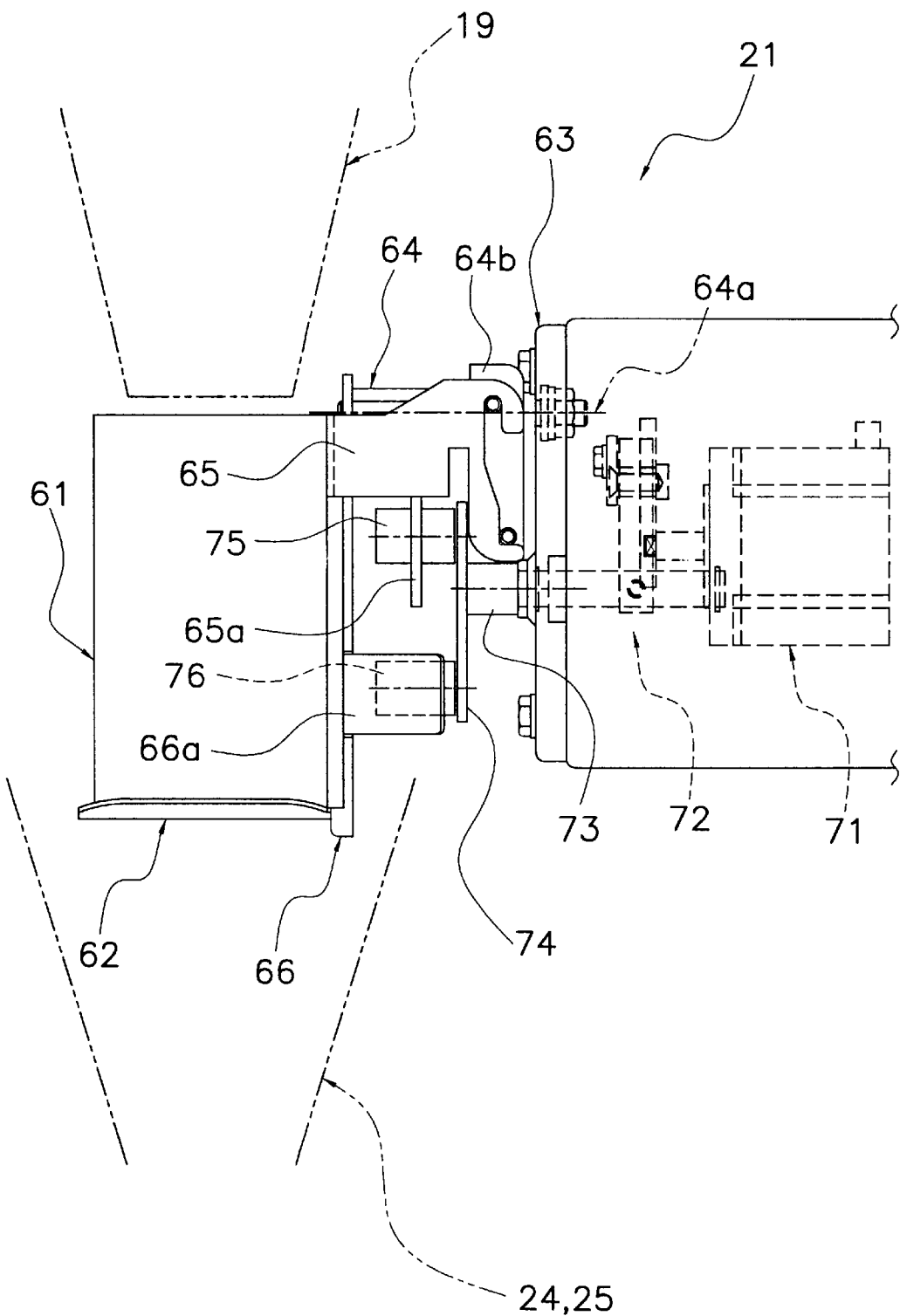
FIG. 7 is an elevational side view of the allocating mechanism of FIG. 1.

As seen in FIG. 5, the tubular member 61 is a rectangular tubular member which is open on upper and bottom ends. An upper portion of the tubular member 61 is fixed to a swing axis 64, which is rotatably supported by the support body 63. More specifically, as seen in FIG. 7, an attachment portion 65 is formed on a rear surface of the tubular member 61. The attachment portion 65 engages a set portion 64b, which is fixed to the swing axis 64. Two roller receivers 65a that extend downward from the attachment portion 65 are disposed so as to sandwich a roller 75 of the driving portion, which will be described below.

Bottom Plate

The bottom plate 62 can, together with the tubular member 61, form a storage space S (see FIG. 5) in which the objects are stored. This storage space S is formed when the bottom plate 62 closes the bottom opening of the tubular member 61. Also, the bottom plate 62 has an arch shape whose center aligns with a swing center 64a of the swing axis 64 as shown in FIG. 7. The bottom plate 62 is shaped to be slightly longer than the width of the bottom opening of the tubular member 61 as shown in FIG. 5. Referring again to FIG. 7, the bottom plate 62 is connected to the swing axis 64 via the coupling member 66. A bottom portion of the coupling member 66 is fixed to the bottom plate 62, while an upper portion is rotatably supported by an end of the swing axis 64. Therefore, the bottom plate 62 is supported so as to be able to swing about the swing axis 64. The coupling member 66 has two roller receivers 66a formed thereon. The roller receivers 66a are disposed so as to sandwich a roller 76 of the driving portion, which will be described below. Since the allocating mechanism 21 is disposed in a position shown in FIG. 5, the storage space S straddles both hoppers 24 and 25 above the two hoppers 24 and 25.

Driving Portion

Figure 6:
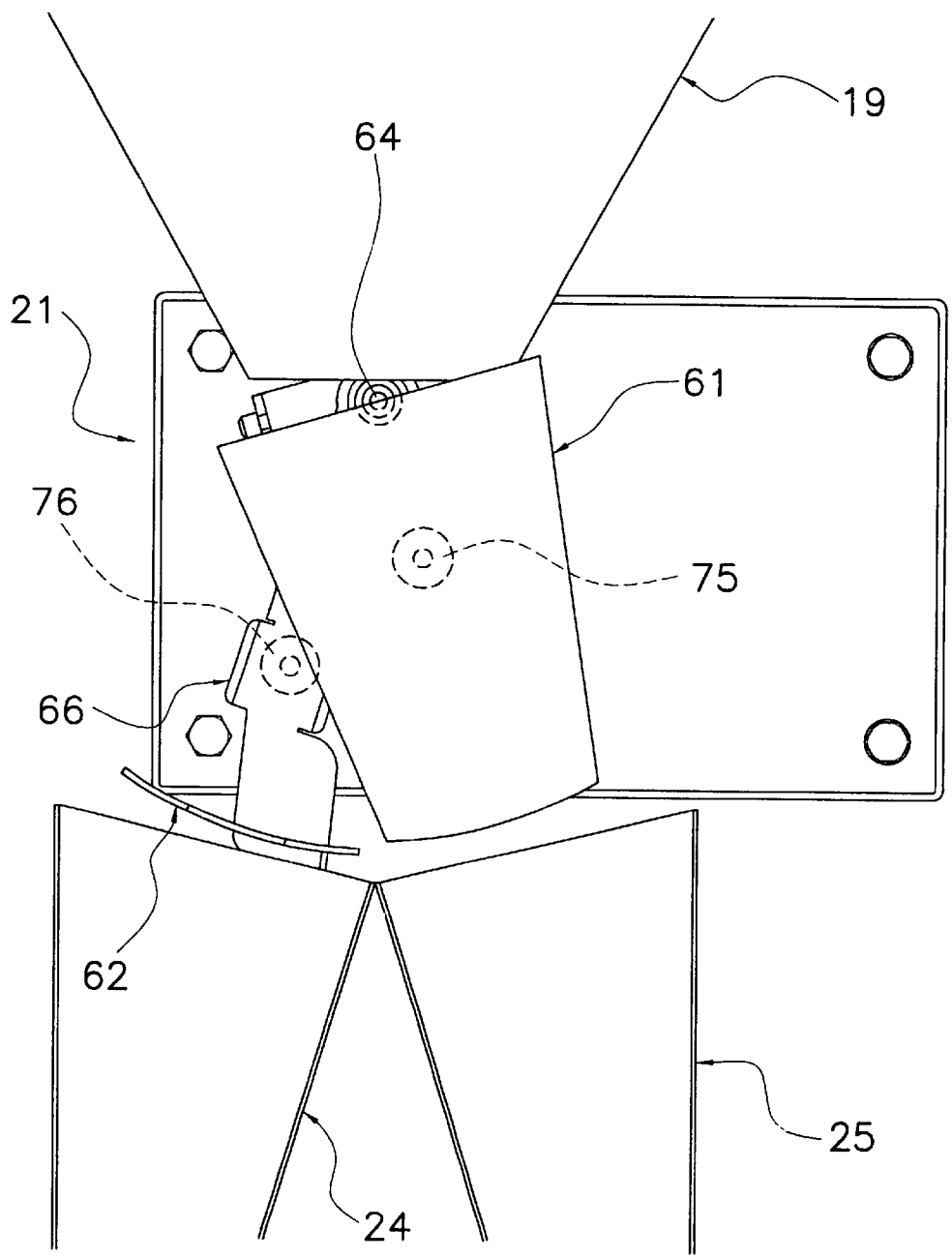
FIG. 6 is an elevational view showing an operation of the allocating mechanism of FIG. 1.

The driving portion has a driving motor 71, and swings the tubular member 61 and bottom plate 62 such that the tubular member 61 and the bottom plate 62 move in different directions. The driving portion includes the driving motor 71, a link mechanism 72, a rotational axis 73, a rotational plate 74, and rollers 75 and 76. The driving motor 71 is a servomotor, which is capable of small rotational control and rotational direction control. The driving motor 71 is controlled by a controller 30, which will be described below. The link mechanism 72 transmits rotation of the driving motor 71 to the rotational axis 73 after reducing the speed of the rotation. The rotational axis 73 passes through the support body 63. The rotational plate 74 is fixed to an end of the rotational axis 73. The roller 75 is rotatably supported by an upper portion of the rotational plate 74, while the roller 76 is rotatably supported by a bottom portion of the rotational plate 74. The rollers 75 and 76 both extend toward the tubular member 61. Two roller receivers 65a of the tubular member 61 are disposed on both sides of the roller 75, while two roller receivers 66a of the coupling member 66, which is fixed to bottom plate 62, are disposed on both sides of the roller 76. Therefore, as the rollers 75 and 76 move in accordance with rotation of the rotational axis 73 and the rotational plate 74, the tubular member 61 and the bottom plate 62 swing in different direction, as seen in FIG. 6. The distances between the rotational axis 73 and the roller 75, and between the rotational axis 74 and the roller 76 are set such that the swing angle of the tubular member 61 is substantially the same as the swing angle of the bottom plate 62 toward the opposite side.

Allocation Hopper

As seen in FIG. 3, the allocation hoppers 24 and 25 temporarily keep the objects dropped from the allocating mechanism 21, and discharge the objects to the conveyor 29. Gate mechanisms 26 that open and close bottom openings are provided for the allocation hoppers 24 and 25.

The gate mechanism 26 is a mechanism that includes a driving motor 26a (see FIG. 4) and a gate member. The gate member is a member that can close the bottom openings of the allocation hoppers 24 and 25. The gate member rotates as the driving motor 26a operates. As the gate member rotates, the bottom opening of the allocation hopper 24 or 25 is switched between a closed state and an open state.

Controller

Figure 4:
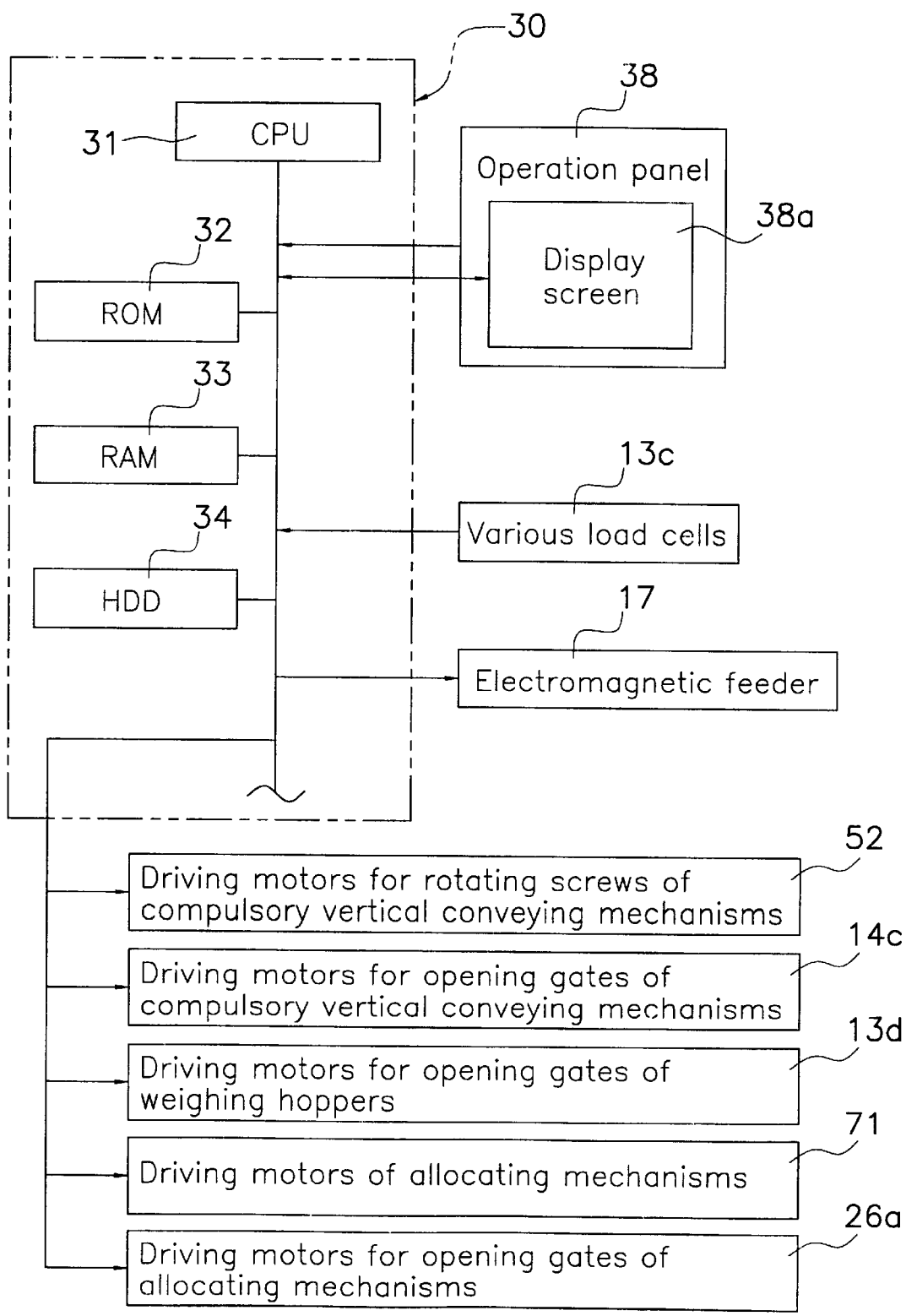
FIG. 4 is a view of a block chart of a controller in accordance with an embodiment of the present invention.

The controller 30 controls various driving motors and the electromagnetic feeder 17. As shown in FIG. 4, the controller 30 includes a microcomputer which is formed by a CPU 31, a ROM 32, a RAM 33, and a HDD 34 (hard disk), and an operation panel 38 that is connected to the microcomputer. An operator can be informed of a status of the apparatus through a liquid crystal display screen 38a that also functions as an operation panel 38. The operator can also adjust control of the weighing apparatus 10 by touching the display screen 38a or punching an operation key that is provided separately. Load cells 13c that measure weight of objects in each weighing hopper 13 are connected to the controller 30. Accordingly, weight data are frequently sent from each load cell 13c to the controller 30. The electromagnetic feeder 17, the driving motors 52 of the compulsory vertical conveying mechanisms 14, driving motors 14c, driving motors 13d of the gate mechanisms 13b of weighing hoppers 13, driving motors 71 of the allocating mechanisms 21, and driving motors 26a for opening and closing the gates of allocation hoppers are connected to the controller 30, such that they operate based on a command from the controller 30. The controller 30 issues a command to start an operation or a command to stop the operation to each driving portion, based on input from an internal controlling program or operator, or based on a result of combination calculation of weight data obtained from each load cell 13c.

Operation (Control) of Combination Weighing Apparatus in Accordance with the Present Embodiment.

Next, operation of combination weighing apparatus 10 will be explained. As seen in FIGS. 1 and 2, combination weighing apparatus 10 has ten weighing hoppers 13 and ten compulsory vertical conveying mechanisms 14 on left and right sides. The left and right sides can be operated either separately or in a coordinated manner. Since both the left and right groups operate similarly, only one of the groups will be explained.

Entire Operation

As objects are supplied to the input chute 18, the objects drop to the common trough 16 through the bottom opening of the input chute 18. Then, the objects move to a front portion of the plate portion 16a of the common trough 16 as the electromagnetic feeder 17 operates. The objects are stored in the front portion of the common trough 16. From there, the objects flow into the cylindrical portions 16b through the ten circular bores at the bottom surface of the plate portion 16a, as seen in FIG. 3.

The objects that flow into the cylindrical portions 16b further flow into the upper portion of the tubular members 14a, and stop when they meet the screws. The objects that were stopped upon meeting the screws are compulsorily sent downward by the rotation of the driving motors 52 of the compulsory vertical conveying mechanisms 14. As the driving motors 52 rotate, the screws also rotate. Accordingly, the objects drop from the bottom end of the screws onto upper surfaces of the gate members of the gate mechanisms 14a, by an amount that corresponds to the amount of rotation of the screws. The controller 30 controls each driving motor 52, such that the amount of the objects becomes the optimal amount to be inputted to the weighing hoppers 13.

In this manner, a predetermined amount of objects on the gate members of the gate mechanisms 14b is inputted to the weighing hoppers 13 by opening the gate mechanisms 14b. Once the objects are inputted to the weighing hoppers 13, their weights are measured by the load cells 13c, and sent to the controller 30. Referring to FIG. 4, the controller 30 performs combination calculation based on the measured weight data from each load cell 13c. For instance, by configuring to input approximately 20 grams of objects in each weighing hopper 13, combination calculation is performed to select three weighing hoppers that generate a total weight of approximately and greater than 60 grams out of the ten weighing hoppers 13. Referring to FIG. 3, once a combination of the weighing hoppers 13 that generates the predetermined weight is determined, the gate mechanisms 13b that correspond to the selected weighing hoppers 13 are opened. In this way, the objects are dropped to the discharge collection chute 19. Then, the objects are put together in one batch at the discharge collection chute 19, and inputted in the storage space S of the allocating mechanism 21.

At the time of inputting the objects from the discharge collection chute 19 to the allocating mechanism 21, the allocating mechanism 21 is in a state in which the bottom opening of the tubular member 61 is closed with the bottom plate 62, as shown in FIG. 5. The objects that are temporarily stored in the storage space S are allocated to either of the allocation hoppers 24 and 25, as the driving motor 71 operates and the tubular member 61 and the bottom plate 62 swing away from each other.

The objects that are allocated to either the allocation hopper 24 or allocation hopper 25 are temporarily stored therein, and then discharged to the conveyor 29 by opening and closing the gate mechanism 26.

Details of Operation of Allocating Mechanism

Details of operation of the allocating mechanism 21 will now be explained referring to Figures 10a–10e.

Figure 10:
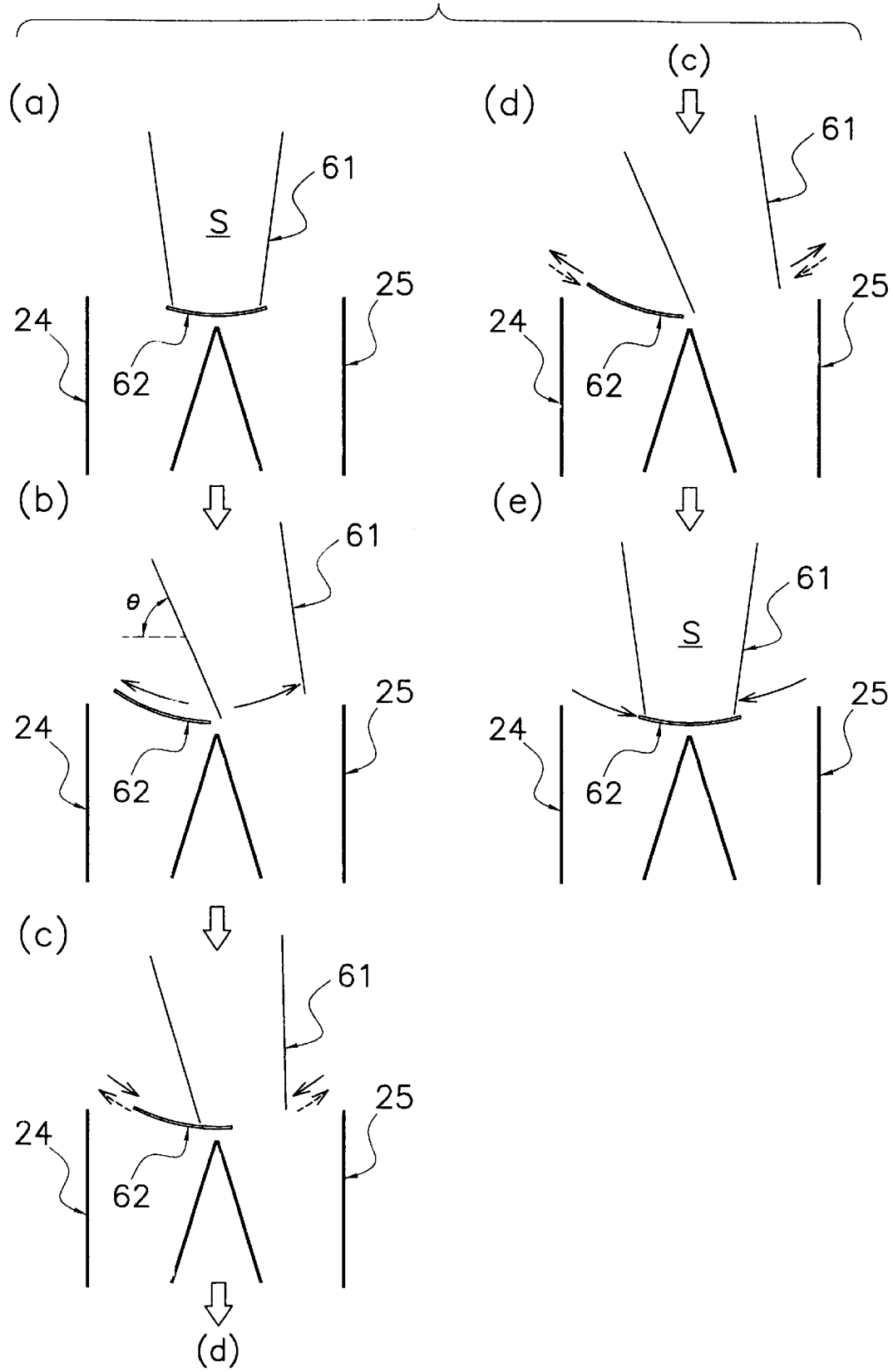
FIG. 10 is a simplified elevational view showing operational flow of the allocating mechanism of FIG. 1.

The objects collected from the discharge collection chute 19 are temporarily stored in the allocating mechanism 21, while the storage space S is formed within the allocating mechanism 21 as shown in FIG. 10(a). When these objects are dropped to the hopper 25, the tubular member 61 and bottom plate 62 swing as shown in FIG. 10(b), such that the bottom opening of the tubular member 61 moves above the hopper 25, and the bottom plate 62 moves above the hopper 24. These swinging movements are performed simultaneously by the operation of the driving motor 71. Next, the controller 30 slightly changes the rotational direction of the driving motor 71, and causes small reciprocating movements in the tubular member 61 and the bottom plate 62. More specifically, the tubular member 61 and bottom plate 62 repeat 2–3 times reciprocating swinging movements, in which the tubular member 61 and bottom plate 62 shift from the state shown in FIG. 10(b) to the state shown in FIG. 10(c), and return to the state shown in FIG. 10(d). In this manner, even in the case of objects having high adhesiveness such as fermented soybeans, objects that are stuck to the tubular member 61 can be dropped to the hopper 25. Then, after the above-described process of shaking off the objects is performed, the controller 30 returns the tubular member 61 and bottom plate 62 in their original state. The allocating mechanism 21 creates the storage space S as shown in FIG. 10(e), and waits for the next supply of objects from the discharge collection chute 19.

Figure 8:
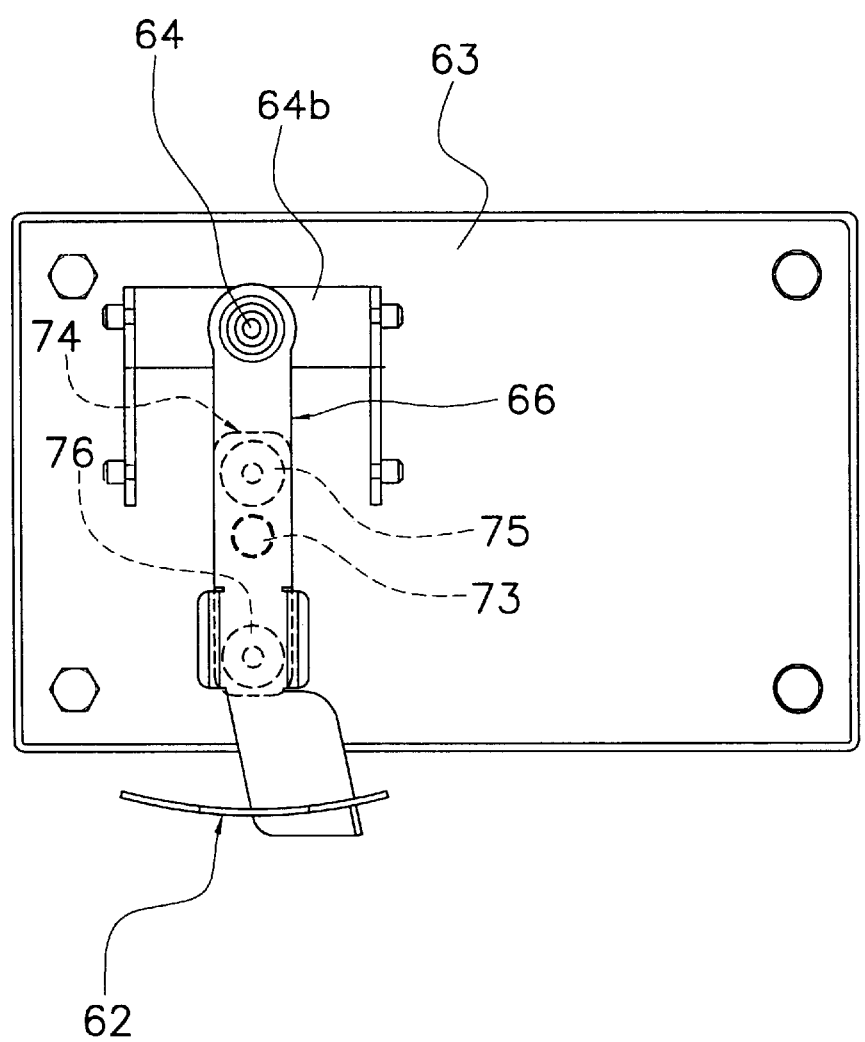
FIG. 8 is an elevational view of the allocating mechanism of FIG. 1 with the tubular member removed.
Figure 9:
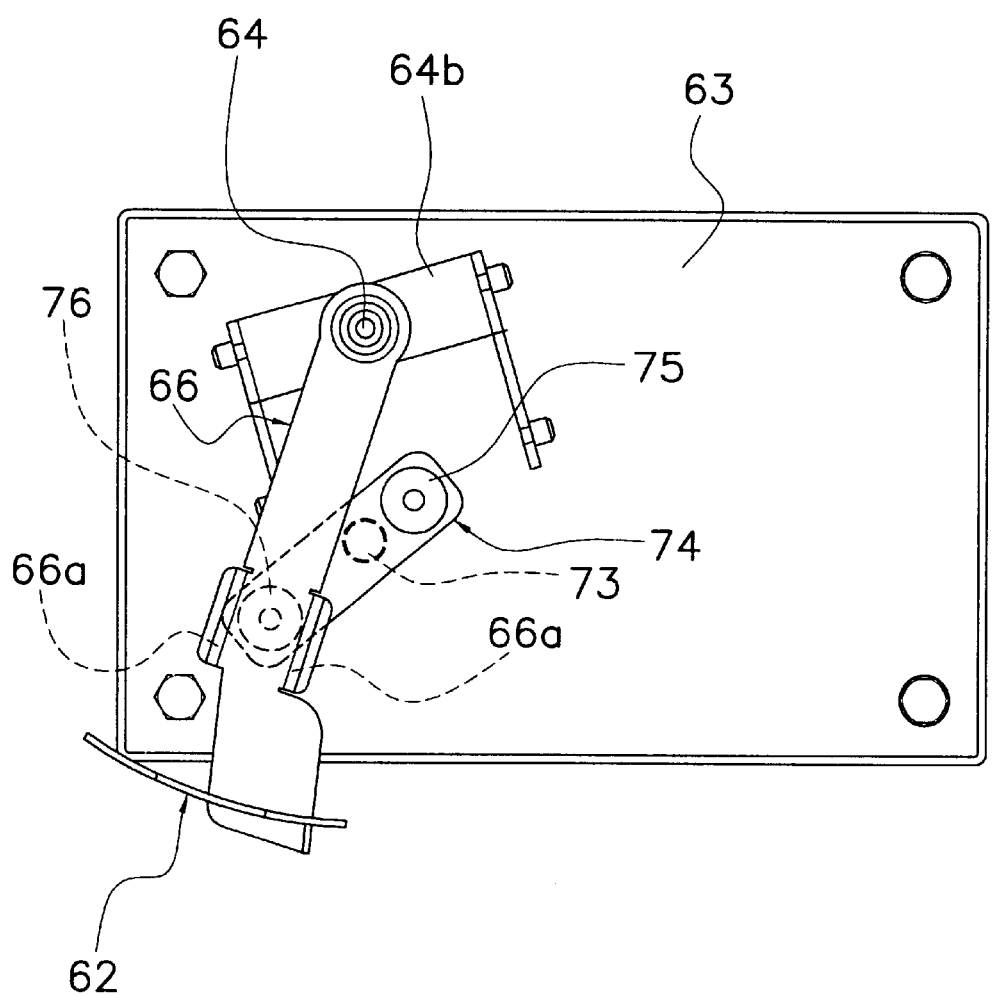
FIG. 9 is an elevational view showing an operation of the allocating mechanism of FIG. 1 with the tubular member removed.

The mechanism by which the tubular member 61 and the bottom plate 62 swing as the driving motor 71 operates is as shown in FIGS. 5, 6, 8, and 9. In FIGS. 8 and 9, movements of the bottom plate 62 and the driving portion are shown with the tubular member 61 being removed in order to allow easier comprehension. The tubular member 61 and the bottom plate 62 are led by the movements of the rollers 75 and 76 of the driving portion, and swing about the swing axis 64 in opposite directions.

Features of Allocating Mechanism (1)

A conventional allocating mechanism utilizes a system in which there is a plurality of bottom plates for one tube, and objects are allocated by opening one of the bottom plates. When objects such as fermented soybeans are handled, objects may stick to the closed bottom plate and may not drop off. On the other hand, the allocating mechanism 21 utilizes a system in which the tubular member 61 also moves. The objects are dropped by moving the tubular member 61 and the bottom plate 62, thereby removing the bottom plate 62 from below the tubular member 61. Also, the objects that are stuck to the bottom plate 62 are scraped off by relative movements of the tubular member 61 and the bottom plate 62. Therefore, almost no objects remain in the bottom plate 62. Accordingly, almost all objects in the storage space S are dropped to either hopper 24 or hopper 25.

(2)

In the allocating mechanism 21, instead of moving only the tubular member 61, the bottom plate 62 is moved together with the tubular member 61. Therefore, less swinging is required to remove the bottom plate 62 from below the tubular member 61. Accordingly, inclination θ of the tubular member 61 at the time of dropping the objects (see FIG. 10(b)) can be maintained at a relatively vertical angle.

(3)

In the allocating mechanism 21, the tubular member 61 rotates such that the bottom end of the tubular member 61 swings. Therefore, the structure of the driving portion is smaller in size and less costly to manufacture (see FIGS. 5 and 7) as compared with a structure in which the tubular member 61 is displaced in parallel.

Since the storage space S formed by the tubular member 61 and the bottom plate 62 is disposed in the allocating mechanism 21 so as to straddle the two hoppers 24 and 25, to which the objects are allocated, the amount the tubular member 61 and the bottom plate 62 move can be kept small, regardless to which of the hoppers 24 and 25 the objects are to be allocated (see FIGS. 5 and 6). Therefore, it is possible to achieve a narrow allocation pitch, which makes the allocating mechanism 21 advantageous in adjusting to various allocation pitches.

In the allocating mechanism 21, small reciprocating movement (vibration) is caused in the tubular member 61 when the objects are dropped in the hoppers 24 and 25. Therefore, even when the objects are adhesive and do not come off easily, the reciprocating movement of the tubular member 61 shakes off most of the objects.

Although it is possible to vibrate only the tubular member 61 if the tubular member 61 and the bottom plate 62 are driven separately, a single driving source driving motor 71 is provided in this embodiment. Therefore, the control is simplified, the driving portion is reduced in size, and the cost is reduced.

Other Embodiments (A)

In the above embodiment, the present invention is applied to the allocating mechanism 21 that allocates objects after the objects are weighed. However, the present invention can also be applied to an allocating mechanism that allocates objects before the objects are weighed. For instance, by forming a structure in which objects are inputted to the weight hoppers 13 through allocating mechanism, and by forming the allocating mechanism as the above-described allocating mechanism 21, it is possible to achieve allocation of the objects in two sets of weighing hoppers 13.

(B)

Figure 11:
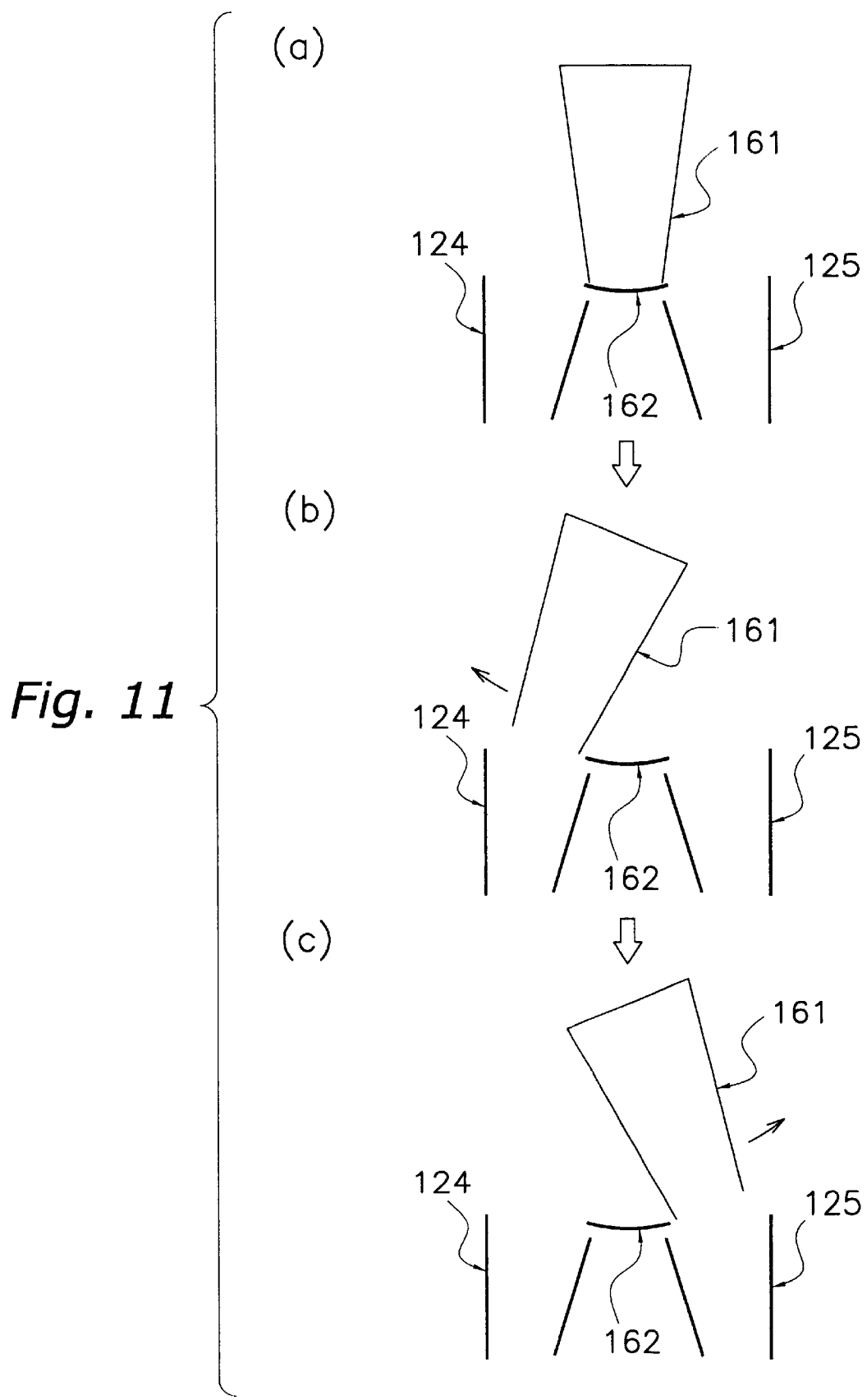
FIG. 11 is a simplified elevational view showing operational flow of allocating mechanism in accordance with an alternate embodiment of the present invention.
Figure 12:
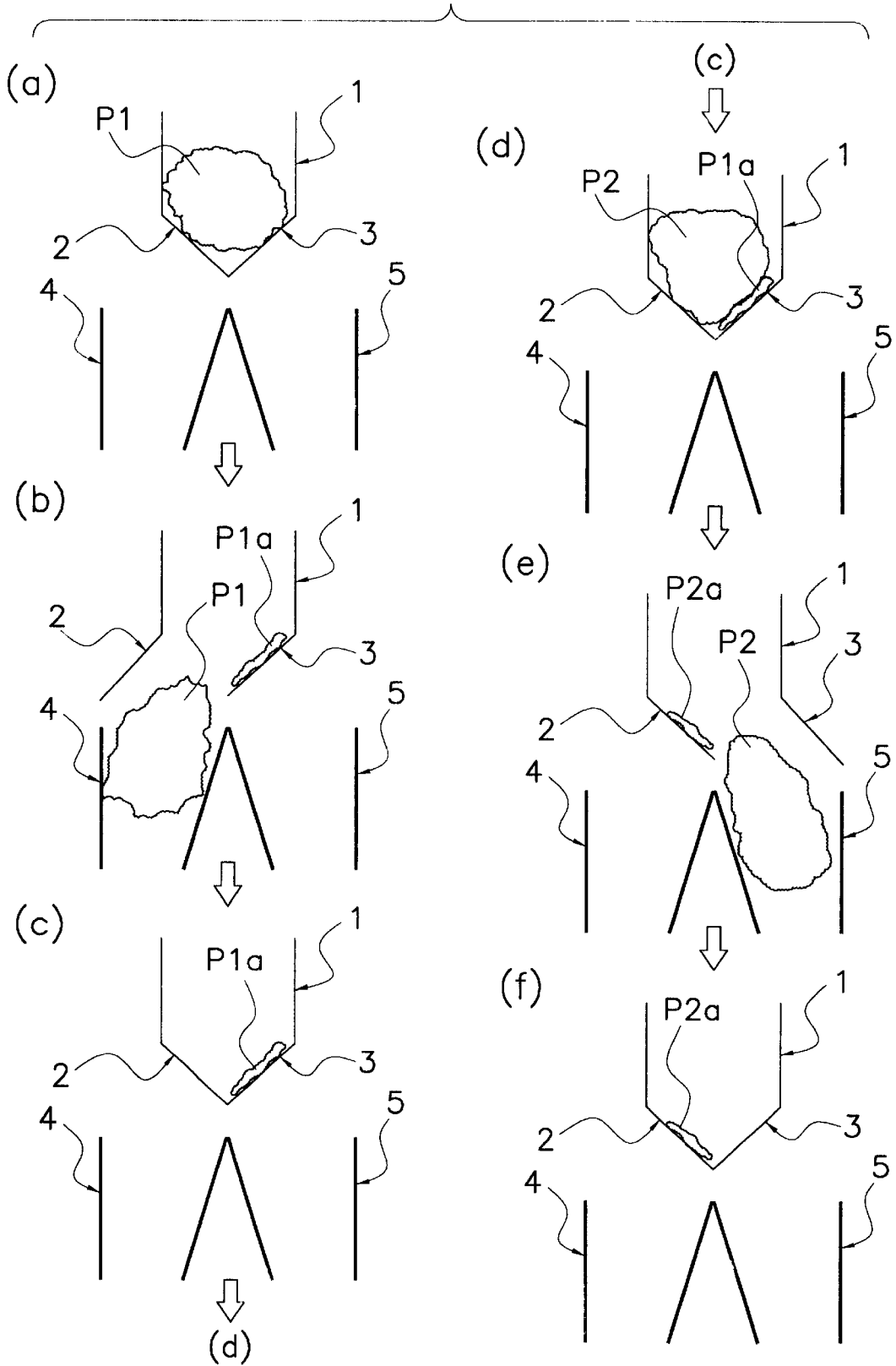
FIG. 12 is a simplified elevational view showing operational flow of a conventional allocating mechanism.

The above-described embodiment employs a structure in which the bottom plate 62, and the tubular member 61 move. However, it is possible to employ a structure in which the bottom plate is fixed. For instance, as seen in FIG. 11, the allocating mechanism can have a structure in which a bottom plate 162 is disposed in between two hoppers 124 and 125, to which the objects are allocated, and only a tubular member 161 is rotated, such that the objects are dropped in one of the hoppers 124 and 125. In this case also, the objects do not remain in the bottom plate 162. It is possible to drop the objects securely by causing reciprocating shaking-off movement in the tubular member 161.

Where a structure in which only the tubular member 161 moves is used, it is preferable to take measures such as increasing the radius of rotation such that the tubular member 161 at the time of dropping the objects does not become too inclined.

(C)

Where mesh process or emboss process is applied to a portion of members (such as the tubular member 61 and the bottom plate 62) that contacts the objects, adhesion of the objects can be further prevented.

(D)

In the above embodiment, the objects such as fermented soybeans are considered. However, the allocating mechanism 21 is also effective with objects that leave powders adhered to tubular members 61 as the objects are conveyed.

(E)

In the above embodiment, the objects that are stuck are shaken off by causing small reciprocating movements (vibrations) in the tubular member 61. Instead, it is possible to employ a structure in which vibration of the tubular member 61 is caused by applying a shock to the tubular member 61 from the side, such as by hitting the tubular member 61 with a rod. Also, it is also possible to employ a structure in which the tubular member 61 and the bottom plate 62 are constantly vibrated by use of an air vibrator.

Since the allocating mechanism of the present invention utilizes a system in which the sidewall is moved, the bottom plate can be removed from below the sidewall by moving the sidewall. In this manner, even when the objects are sticky, less objects remain on the bottom plate.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An allocating mechanism for a weighing apparatus that temporarily stores objects and allocates the objects to a plurality of paths disposed below after or before the objects are weighed, said allocating mechanism comprising:
    a sidewall;
    a bottom, said bottom forming a storage space with said sidewall in which the objects are stored;
    driving means configured to move at least said sidewall; and
    a controller configured to rotate said sidewall by controlling said driving means such that a bottom end of said sidewall swings, thereby dropping the objects to one of the paths.

2. The allocating mechanism as set forth in claim 1, wherein
    said sidewall is formed with a substantially vertical surface; and
    said bottom is formed with a substantially horizontal curved surface that allows free rotation of said sidewall.

3. The allocating mechanism as set forth in claim 1, wherein
    said driving means moves both said sidewall and said bottom such that said sidewall and said bottom move away from each other.

4. The allocating mechanism as set forth in claim 3, wherein
    said storage space formed by said sidewall and said bottom is disposed above said two paths so as to straddle said two paths.

5. The allocating mechanism as set forth in claim 1, wherein
    said controller controls said driving means to vibrate said sidewall above the paths at the time of dropping the objects in one of the paths.

6. The allocating mechanism as set forth in claim 2, wherein
    said plurality of paths include two paths,
    said controller controls said driving means to vibrate said sidewall above the paths at the time of dropping the objects in one of the paths.

7. The allocating mechanism as set forth in claim 3, wherein
    said controller controls said driving means to vibrate said sidewall above the paths at the time of dropping the objects in one of the paths.

8. The allocating mechanism as set forth in claim 4, wherein
    said controller controls said driving means to vibrate said sidewall above the paths at the time of dropping the objects in one of the paths.

9. The allocating mechanism as set forth in claim 2, wherein
    said driving means moves both said sidewall and said bottom such that said sidewall and said bottom move away from each other.

\* \* \* \* \*